United States Patent
Salem et al.

(10) Patent No.: US 12,470,405 B2
(45) Date of Patent: Nov. 11, 2025

(54) SECURE CERTIFICATE CHAIN TRANSITION

(71) Applicant: Microsoft Technology Licensing, LLC, Redmond, WA (US)

(72) Inventors: Karim Salem, Seattle, WA (US); Avanindra Paruchuri, Sammamish, WA (US); Alexander Geoffrey Howells, Sammamish, WA (US); George Adrian Drumea, Kirkland, WA (US); Zhifeng Wang, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 80 days.

(21) Appl. No.: 18/589,143

(22) Filed: Feb. 27, 2024

(65) Prior Publication Data
US 2025/0274294 A1    Aug. 28, 2025

(51) Int. Cl.
*H04L 9/32* (2006.01)

(52) U.S. Cl.
CPC .......... *H04L 9/3265* (2013.01); *H04L 9/3268* (2013.01)

(58) Field of Classification Search
CPC ............................ H04L 9/3265; H04L 9/3268
See application file for complete search history.

(56) References Cited

U.S. PATENT DOCUMENTS

| | | | |
|---|---|---|---|
| 9,336,359 B2 * | 5/2016 | Jain | G06F 21/10 |
| 2007/0136574 A1 | 6/2007 | Oh | |
| 2017/0289137 A1 * | 10/2017 | Pendarakis | H04L 63/0823 |
| 2021/0021434 A1 * | 1/2021 | Barnes | H04L 9/3265 |

OTHER PUBLICATIONS

International Search Report and Written Opinion received for PCT Application No. PCT/US2025/010365, mailed on Apr. 3, 2025, 13 pages.

(Continued)

*Primary Examiner* — Hany S. Gadalla

(57) ABSTRACT

Some embodiments provide proxies or other servers in a computing network with independent certificate chains which facilitate mitigation of certificate problems. Independence criteria are enforced against two or more installed certificate chains on a given server, identifying and avoiding dependencies such as cross-certification, shared certificate authorities, shared revocation lists, or shared certificate status protocol endpoints between the certificate chains. Some embodiments serve independent certificates concurrently in an active-active certificate server configuration. The certificate chains' coexistence and their independence from one another facilitates transitioning the network from a failing issuer or a failed chain to a chain that works better, thereby improving network resilience and limiting damage from certificate problems. By dynamically updating certificate bindings, some embodiments also facilitate safe deployment of new certificates during migration from one issuer to another. Certificate distributions are computed from issuer ratios, network topology, or both.

19 Claims, 3 Drawing Sheets

(56) References Cited

OTHER PUBLICATIONS

"Server Certificate Error", retrieved from << https://trust.zscaler.com/zscalerthree.net/posts/13806 >>, Mar. 8, 2023, 2 pages.
"Digicert Root and Intermediate CA Certificate Updates 2023", retrieved from << https://knowledge.digicert.com/general-information/digicert-root-and-intermediate-ca-certificate-updates-2023 >>, Mar. 8, 2023, 12 pages.
"Server Name Indication", retrieved from << https://en.wikipedia.org/wiki/Server_Name_Indication >>, Jan. 11, 2024, 11 pages.
"Active/Passive vs. Active/Active", retrieved from << https://kemptechnologies.com/white-papers/unfog-confusion-active-passive-activeactive-load-balancing >>, no later than Jan. 21, 2024, 4 pages.
John Carl Villanueva, "Active-Active vs. Active-Passive High-Availability Clustering", retrieved from << https://www.jscape.com/blog/active-active-vs-active-passive-high-availability-cluster >>, Nov. 30, 2023, 11 pages.
"Hiawatha logoHowTo: Normal and TLS bindings", retrieved from << https://www.hiawatha-webserver.org/howto/bindings >>, no later than Jan. 21, 2024, 3 pages.
"Transport Layer Security (TLS) registry settings", retrieved from << https://learn.microsoft.com/en-us/windows-server/security/tls/tls-registry-settings?tabs=diffie-hellman >>, Apr. 10, 2023, 12 pages.
"HttpUpdateServiceConfiguration function (http.h)", retrieved from << https://learn.microsoft.com/en-us/windows/win32/api/http/nf-http-httpupdateserviceconfiguration >>, Oct. 12, 2021, 4 pages.
"What is a SAN (Subject Alternative Name) Certificate?", retrieved from << https://knowledge.digicert.com/solution/what-is-san-certificate >>, Oct. 26, 2023, 3 pages.
Screenshots, retrieved from << https://aadg.windows.net/gatewayping.aspx >> Jan. 21, 2024, 1 page.
"How to avoid Certificate Outages", retrieved from << https://www.encryptionconsulting.com/education-center/how-to-avoid-certificate-outages/ >>, no later than Jan. 22, 2024, 13 pages.
"TLS/SSL Certificate Management Best Practices Checklist", retrieved from << https://www.digicert.com/resources/fact-sheet/DigiCert_BestPractices.pdf >>, no later than Jan. 22, 2024, 1 page.
"How to avoid service outages when digital certificates expire", retrieved from << https://www.digitalberry.fr/en/how-avoid-service-outages-digital-certificates-expire/ >>, Sep. 19, 2019, 7 pages.
"Certificate authority", retrieved from << https://en.wikipedia.org/wiki/Certificate_authority >>, Jan. 22, 2024, 13 pages.
"Public key certificate", retrieved from << https://en.wikipedia.org/wiki/Public_key_certificate >>, Jan. 22, 2024, 12 pages.
"Domain-validated certificate", retrieved from << https://en.wikipedia.org/wiki/Domain-validated_certificate >>, Jan. 22, 2024, 2 pages.
"Transport Layer Security", retrieved from << https://en.wikipedia.org/wiki/Transport_Layer_Security >>, Jan. 22, 2024, 42 pages.
Jeffery Walton, et al., "Certificate and Public Key Pinning", retrieved from << https://owasp.org/www-community/controls/Certificate_and_Public_Key_Pinning >>, Jan. 22, 2024, 27 pages.
"Stop Certificate Pinning", retrieved from << https://www.digicert.com/blog/certificate-pinning-what-is-certificate-pinning >>, Jan. 22, 2024, 11 pages.
"Cross certificate", retrieved from << https://csrc.nist.gov/glossary/term/cross_certificate >>, Jan. 22, 2024, 2 pages.
"Cross Certification", retrieved from << https://learn.microsoft.com/en-us/windows/win32/seccertenroll/about-cross-certification >>, Jan. 7, 2021, 2 pages.
"Add and manage TLS/SSL certificates in Azure App Service", retrieved from << https://learn.microsoft.com/en-us/azure/app-service/configure-ssl-certificate?tabs=apex >>, Jul. 28, 2023, 15 pages.
Ravi, "Understanding TLS Certificates", retrieved from << https://medium.com/demystifying-security/understanding-tls-certificates-76bdd5815d95 >>, Apr. 29, 2020, 10 pages.
"What is the rationale of binding SSL certificates to a domain name? [duplicate]", retrieved from << ttps://security.stackexchange.com/questions/171698/what-is-the-rationale-of-binding-ssl-certificates-to-a-domain-name >>, Oct. 19, 2017, 2 pages.
"Binding in Windows IIS 10", retrieved from << https://www.ssl.com/how-to/binding-in-iis-10/ >>, Feb. 12, 2020, 12 pages.
"Spinner: Semi-Automatic Detection of Pinning without Hostname verification", retrieved from << https://chrismcmstone.github.io/Spinner/ >>, Jan. 29, 2024, 2 pages.
"Defeating Android Certificate Pinning with Frida", retrieved from << https://httptoolkit.com/blog/frida-certificate-pinning/ >>, Jan. 29, 2024, 14 pages.
"What is Certificate pinning?", retrieved from << https://learn.microsoft.com/en-us/azure/security/fundamentals/certificate-pinning >>, Dec. 6, 2023, 2 pages.
"ECC vs RSA: Comparing SSL/TLS Algorithms", retrieved from << https://cheapsslsecurity.com/p/ecc-vs-rsa-comparing-ssl-tls-algorithms/ >>, Jan. 29, 2024, 4 pages.

* cited by examiner

SOME ADDITIONAL ASPECTS OF CERTIFICATE MANAGEMENT 302

| CERTIFICATE AUTHORITY 402 | IDENTITY 404 | DOMAIN NAME 406 |
|---|---|---|
| PORT 408 IDENTIFIER 410 | IP ADDRESS 412 | GATEWAY 414 |

| INTERMEDIATE CERTIFICATE AUTHORITY (ICA) 416 CERTIFICATE 418, 130 | ROOT CERTIFICATE 420, 130 |
|---|---|

| SERVER NAME INDICATION (SNI) 422 | CROSS-CERTIFICATION 424 |
|---|---|

| CERTIFICATE PINNING 428 | ONLINE CERTIFICATE STATUS PROTOCOL (OCSP) 430 ENDPOINT 432 | BINDINGS CONFIGURATION 456 |
|---|---|---|

CERTIFICATE REVOCATION LIST (CRL) 434 DISTRIBUTION POINT 436

| PERCENTAGE 438, 324 | VARIABLE 440 | CLIENT 442 IDENTITY 444, 404 |
|---|---|---|
| TIME PERIOD 446 | WEB SERVER 448 | NETWORK TOPOLOGY 450 |

| CERTIFICATE ISSUER MIGRATION 452 COMMAND 454 | REGION 458 |
|---|---|

Fig. 4

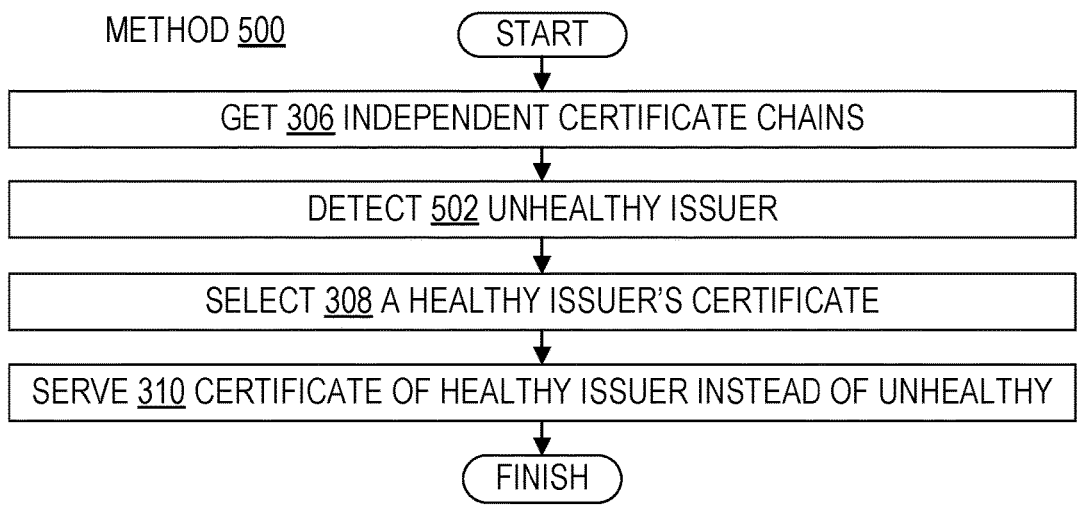

Fig. 5

SECURE CERTIFICATE CHAIN TRANSITION

BACKGROUND

Public key certificates, also known as digital certificates, identity certificates, or security certificates, are digital documents designed to be used to prove the validity of a public key. Public keys are often provided through a public key infrastructure (PKI). Public keys are used in various ways, e.g., for email encryption, code signing by vendors, e-signing of legal documents, and to help secure communications with web sites. The letters "HTTPS" in an internet address indicate that communications are being secured using a public key together with a communication protocol known as "hypertext transfer protocol secure" (HTTPS). HTTPS was previously secured using a protocol known as "secure sockets layer" (SSL) but is currently often secured using a protocol known as "transport layer security" (TLS).

However, despite advances in public key infrastructures and communication protocols, problems still arise involving digital certificates. Accordingly, improvements in technical areas involving the use of digital certificates would be beneficial.

SUMMARY

Some embodiments address technical challenges arising from problems with digital certificates. For example, in some scenarios a certificate chain is a single-point-of-failure (SPF) for a computing network. A certificate belongs to a certificate chain which has one or more issuers, and certificates are bound to domains or other identities. Servers serving a domain utilize a certificate. If part of a certificate chain expires, or if a certificate authority (CA) specified in the chain becomes unreachable, then the communications, transactions, and other computational activities which utilize the certificate chain can be delayed or fail entirely. Such delays and failures can be sudden, widespread, and extremely damaging.

Some embodiments taught herein prevent or mitigate certificate chain problems by (a) getting a first certificate chain which includes a first binding between a first certificate issued by a first certificate authority and an identity in a computing network, such that the first certificate authority is specified in the first certificate, and the first certificate belongs to the first certificate chain, (b) getting a second certificate chain which includes a second binding between a second certificate issued by a second certificate authority and the identity, such that the first binding and the second binding coexist in the computing network, the second certificate authority is specified in the second certificate, the second certificate belongs to a second certificate chain, and the first certificate chain and the second certificate chain are independent from one another, (c) selecting between the first certificate and the second certificate, and (d) serving the selected certificate. The certificate chains' coexistence and their independence from one another facilitates transitioning the network from a failing or failed chain to a chain that works better, thereby preventing or at least mitigating damage from certificate chain problems.

Other technical activities, technical characteristics, and technical benefits pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form-some technical concepts that are further described below in the Detailed Description. Subject matter scope is defined with claims as properly understood, and to the extent this Summary conflicts with the claims, the claims should prevail.

BRIEF DESCRIPTION OF THE DRAWINGS

A more particular description will be given with reference to the attached drawings. These drawings only illustrate selected aspects and thus do not fully determine coverage or scope.

FIG. 4 is a block diagram illustrating some aspects of certificate management;

FIG. 5 is a flowchart illustrating a certificate management method for certificate chain transitioning in response to a certificate issuer health problem;

DETAILED DESCRIPTION

Overview

Figure 1:
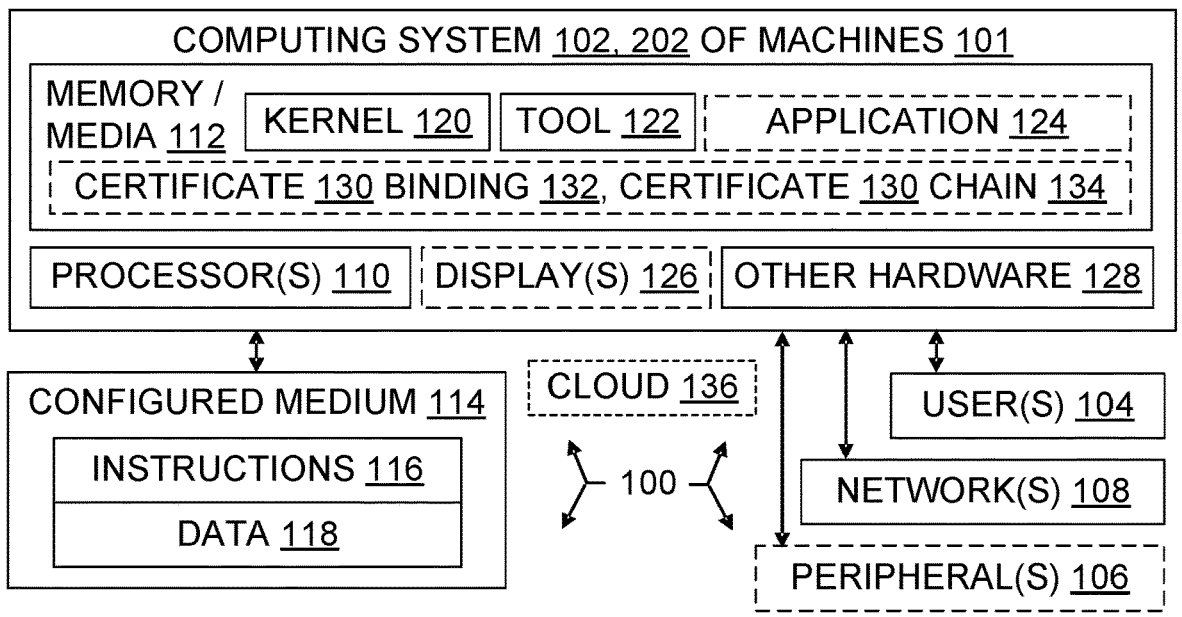
FIG. 1 is a diagram illustrating aspects of computer systems and also illustrating configured storage media, including some aspects generally suitable for embodiments which include or use certificate management functionality.

Some teachings described herein were motivated by technical challenges faced and insights gained during efforts to improve technology for certificate management in view of a risk of certificate validation errors when connecting to cloud services. These challenges and insights provided some motivations, but the teachings herein are not limited in their scope or applicability to these particular errors, tools, motivational challenges, solutions, or insights.

Some embodiments described herein utilize or provide certificate management technology which provides mitigation of certificate validation errors at the level of a gateway or another certificate server. These embodiments can be employed together with other strategies and tools, such as certificate expiration tracking and renewal tools, and advisories or reminders to customer technical personnel.

Some embodiments utilize or provide a certificate management method which includes (a) establishing or ascertaining a first certificate chain which includes a first binding between a first certificate issued by a first certificate authority and an identity in the computing network, such that the first certificate authority is specified in the first certificate, and the first certificate belongs to the first certificate chain, (b) establishing or ascertaining a second certificate chain which includes a second binding between a second certificate issued by a second certificate authority and the identity, such that the first binding and the second binding coexist in the computing network, the second certificate authority is specified in the second certificate, the second certificate belongs to a second certificate chain, and the first certificate chain and the second certificate chain are independent from one another in that: the certificate chains do not share any root certificate with each other, and the certificate chains do not share any intermediate certificate authority certificate with each other, (c) selecting between the first certificate and the second certificate, and (d) serving the selected certificate.

This certificate management functionality has the technical benefit of mitigating or preventing damage from certificate problems in the internal functioning of a computing network. When one certificate's chain has a problem, automatically selecting and serving another certificate from an independent chain allows the computational and network activities that rely on having a valid certificate to continue without undue delay. By contrast, when only one certificate chain is present and available for use within the computer network (i.e., there is effectively no selecting between certificates of independent chains), the expiration of a certificate in that chain will significantly delay, or cause failure of, the computational and network activities that rely on having a valid certificate. Similarly, when only one certificate chain is present and available for use within the computer network, and a denial-of-service attack, a hardware failure, or another unhealthy condition impacts the service of certificates in that solitary chain, the computational and network activities that rely on that chain to provide a valid certificate will be significantly delayed or fail entirely.

Some embodiments verify that the first certificate chain and the second certificate chain are independent from one another, prior to serving the selected certificate, or atomically with the selecting, or both. This certificate management functionality has the technical benefit of ensuring that a chain transition within the computing network will proceed smoothly if the verification confirms that the chains are independent. It also has the technical benefit of avoiding chain transitions which are subject to reliability problems, if the verification reveals that the chains are not currently independent of one another.

In some embodiments, one or more additional chain independence criteria are enforced, such as ensuring that: no certificate in the certificate chain of one of the certificate authorities is signed by a certificate of any other of the certificate authorities (i.e., no cross-certification), the certificate chains do not share any certificate revocation list with each other, the certificate chains do not share any certificate revocation list distribution point with each other, or the certificate chains do not share any online certificate status protocol endpoint with each other. This certificate management functionality has the technical benefit of further improving reliability within the computing network by further restricting which chains are available for use when selecting and serving certificates. With the enforcement of each additional independence criterion, the risk that a given certificate problem will implicate more than one chain is reduced.

In some embodiments, selecting between the first certificate and the second certificate includes selecting according to at least one of: a percentage allocated to the chain of the selected certificate; a topology of the computing network; or a random or quasi-random variable. For present purposes, a percentage, a fraction, and a ratio are interchangeable, e.g., 50% corresponds to one-half, 25% corresponds to a 1:4 ratio, and so on.

This certificate management functionality has the technical benefit of providing flexibility and granularity for the dynamic distribution of certificates within the computing network. In particular, certificate distribution can be adapted to the specific architecture of the computing network, e.g., certificates can be distributed so that certificates of a given chain are served to a particular region, or served by a particular category of server, or served to a particular category of client or a particular category of node. Likewise, primary and backup replicas can be served only with certificates from different and independent chains.

In some embodiments, the certificate management functionality detects that one of the certificate issuers is an unhealthy issuer according to a health metric, and the selecting does not select a certificate that is in a chain of the unhealthy issuer. This has the technical benefit of proactively reducing load on the unhealthy issuer. This also has the technical benefit of reducing the scope of damage ("blast radius") within the computing network if the unhealthy issuer fails entirely.

In some embodiments, the certificate management functionality incrementally alters a selection percentage of a particular issuer over multiple instances of the selecting. This has the technical benefit of migrating the certificate distribution within the computing network between issuers. Migration can be done incrementally, according to a safe deployment plan, to reduce the scope of any damage from transitions and permit rapid rollbacks in the event of problems.

In some embodiments, the certificate management functionality includes gateway machines in an active-active certificate server configuration. The active-active certificate server configuration has the technical benefit of keeping both independent certificate chains active within the computing network, which allows continual monitoring for problems in either chain and better redundancy to improve network reliability.

These and other benefits will be apparent to one of skill from the teachings provided herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 136. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 sometimes interact with a computer system 102 user interface by using displays 126, keyboards 106, and other peripherals 106, via typed text, touch, voice, movement, computer vision, gestures, and/or other forms of I/O. Virtual reality or augmented reality or both functionalities are provided by a system 102 in some embodiments. A screen 126 is a removable peripheral 106 in some embodiments and is an integral part of the system 102 in some embodiments. The user interface supports interaction between an embodiment and one or more human users. In some embodiments, the user interface includes one or more of: a command line interface, a graphical user interface (GUI), natural user interface (NUI), voice command interface, or other user interface (UI) presentations, presented as distinct options or integrated.

System administrators, network administrators, cloud administrators, security analysts and other security personnel, operations personnel, developers, testers, engineers, auditors, and end-users are each a particular type of human user 104. In some embodiments, automated agents, scripts, playback software, devices, and the like running or otherwise serving on behalf of one or more humans also have user accounts, e.g., service accounts. Sometimes a user account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices or networking devices or both are considered peripheral equipment in some embodiments and part of a system 102 in other embodiments, depending on their detachability from the processor 110. In some embodiments, other computer systems not shown in FIG. 1 interact in technological ways with the computer system 102 or with another system embodiment using one or more connections to a cloud 136 and/or other network 108 via network interface equipment, for example.

Each computer system 102 includes at least one processor 110. The computer system 102, like other suitable systems, also includes one or more computer-readable storage media 112, also referred to as computer-readable storage devices 112. In some embodiments, tools 122 include security tools or software applications 124, on mobile devices 102 or workstations 102 or servers 102, editors, compilers, debuggers and other software development tools, as well as APIs, browsers, or webpages and the corresponding software for protocols such as HTTPS, for example. Files, APIs, endpoints, and other resources may be accessed by an account or set of accounts, user 104 or group of users 104, IP address or group of IP addresses, or other entity. Access attempts may present passwords, digital certificates, tokens or other types of authentication credentials.

Storage media 112 occurs in different physical types. Some examples of storage media 112 are volatile memory, nonvolatile memory, fixed in place media, removable media, magnetic media, optical media, solid-state media, and other types of physical durable storage media (as opposed to merely a propagated signal or mere energy). In particular, in some embodiments a configured storage medium 114 such as a portable (i.e., external) hard drive, CD, DVD, memory stick, or other removable nonvolatile memory medium becomes functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory nor a computer-readable storage device is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment is described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, some embodiments include one of more of: chiplets, hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. In some embodiments, components are grouped into interacting functional modules based on their inputs, outputs, or their technical effects, for example.

In addition to processors 110 (e.g., CPUs, ALUs, FPUs, TPUs, GPUS, and/or quantum processors), memory/storage media 112, peripherals 106, and displays 126, some operating environments also include other hardware 128, such as batteries, buses, power supplies, wired and wireless network interface cards, for instance. The nouns "screen" and "display" are used interchangeably herein. In some embodiments, a display 126 includes one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which are present in some computer systems. In some, virtualizations of networking interface equipment and other network components such as switches or routers or firewalls are also present, e.g., in a software-defined network or a sandboxed or other secure cloud computing environment. In some embodiments, one or more computers are partially or fully "air gapped" by reason of being disconnected or only intermittently connected to another networked device or remote cloud. In particular, certificate management functionality 204 could be installed on an air gapped network 108 and then be updated periodically or on occasion using removable media 114, or not be updated at all. Some embodiments also communicate technical data or technical instructions or both through direct memory access, removable or non-removable volatile or nonvolatile storage media, or other information storage-retrieval and/or transmission approaches.

One of skill will appreciate that the foregoing aspects and other aspects presented herein under "Operating Environments" form part of some embodiments. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but interoperate with items in an operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current disclosure.

In any later application that claims priority to the current application, reference numerals may be added to designate items disclosed in the current application. Such items may include, e.g., software, hardware, steps, processes, systems, functionalities, mechanisms, devices, data structures, kinds of data, settings, parameters, components, computational resources, programming languages, tools, workflows, or algorithm implementations, or other items in a computing environment, which are disclosed herein but not associated with a particular reference numeral herein. Corresponding drawings may also be added.

More About Systems

Figure 2:
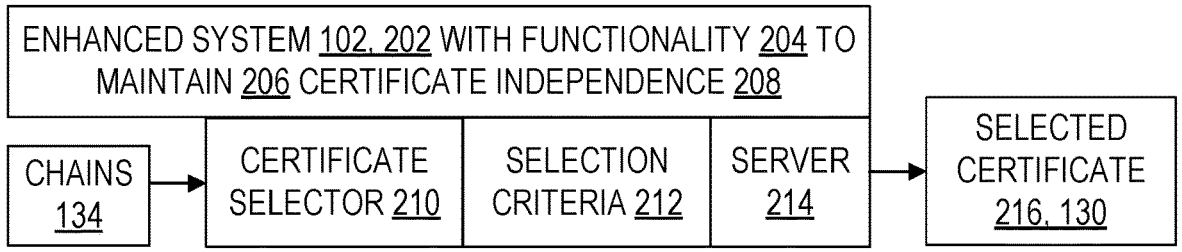
FIG. 2 is a block diagram illustrating aspects of a family of enhanced systems which are each configured with certificate management functionality.

FIG. 2 illustrates a computing system 102 configured by one or more of the certificate management functionality enhancements taught herein, resulting in an enhanced system 202. In some embodiments, this enhanced system 202 includes a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

Figure 3:
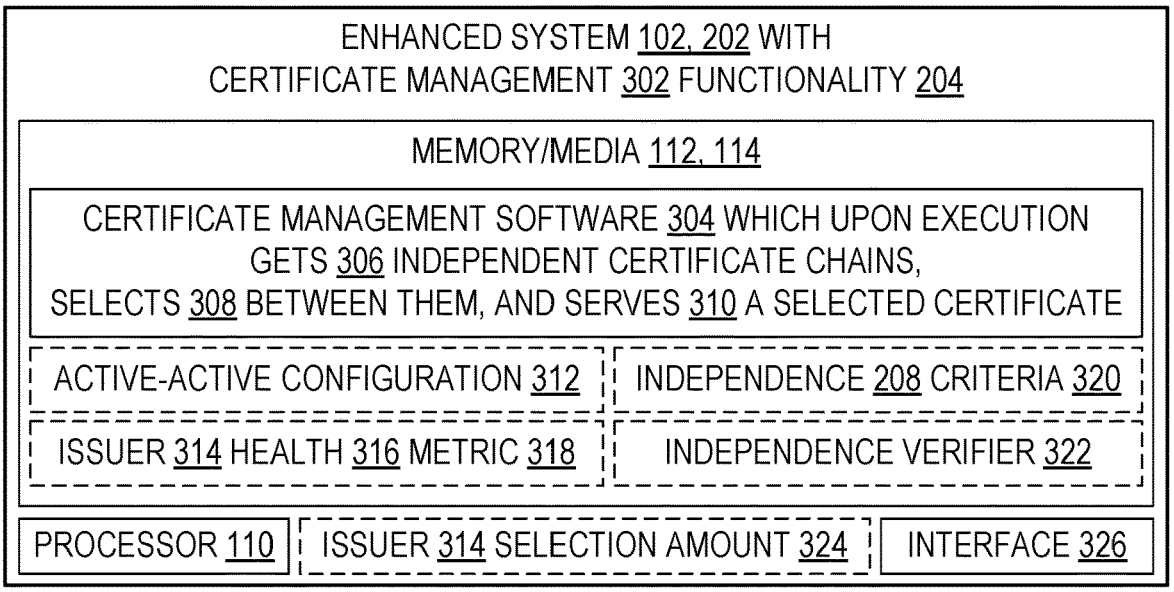
FIG. 3 is a block diagram illustrating aspects of another family of systems which are each enhanced with certificate management functionality.

FIG. 3 shows some aspects of some enhanced systems 202. Like FIG. 2, FIG. 3 is not a comprehensive summary of all aspects of enhanced systems 202 or all aspects of certificate management functionality 204. Nor is either figure a comprehensive summary of all aspects of an environment 100 or system 202 or other context of an enhanced system 202, or a comprehensive summary of any aspect of functionality 204 for potential use in or with a system 102. FIG. 3 items are discussed at various points herein, and additional details regarding them are provided in the discussion of a List of Reference Numerals later in this disclosure document.

FIG. 4 shows some aspects of certificate management 302 and some related items or processes. This is not a comprehensive summary of all aspects of certificate management. FIG. 4 items are discussed at various points herein, and additional details regarding them are provided in the discussion of a List of Reference Numerals later in this disclosure document.

Figure 6:
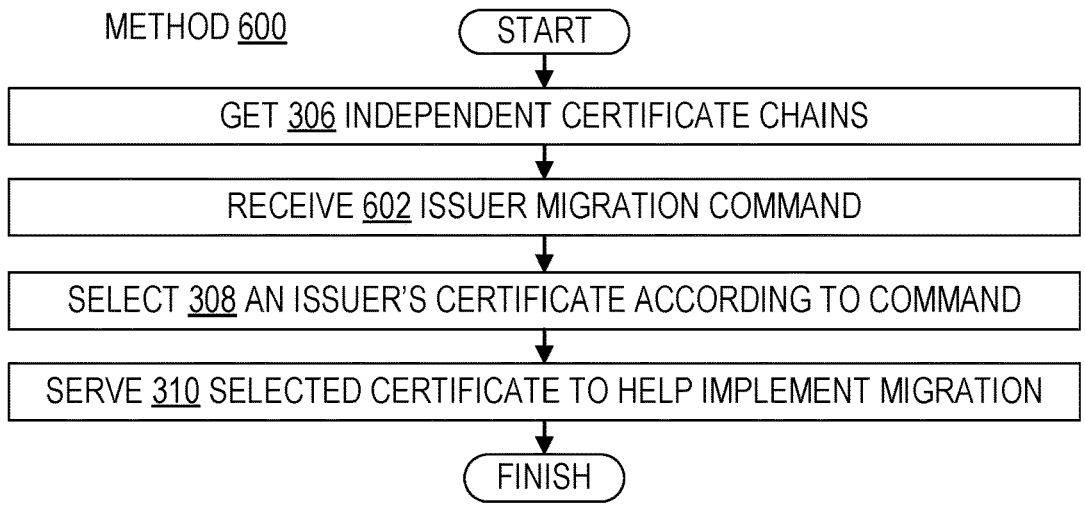
FIG. 6 is a flowchart illustrating a certificate management method for certificate chain transitioning as part of a certificate issuer migration.
Figure 7:
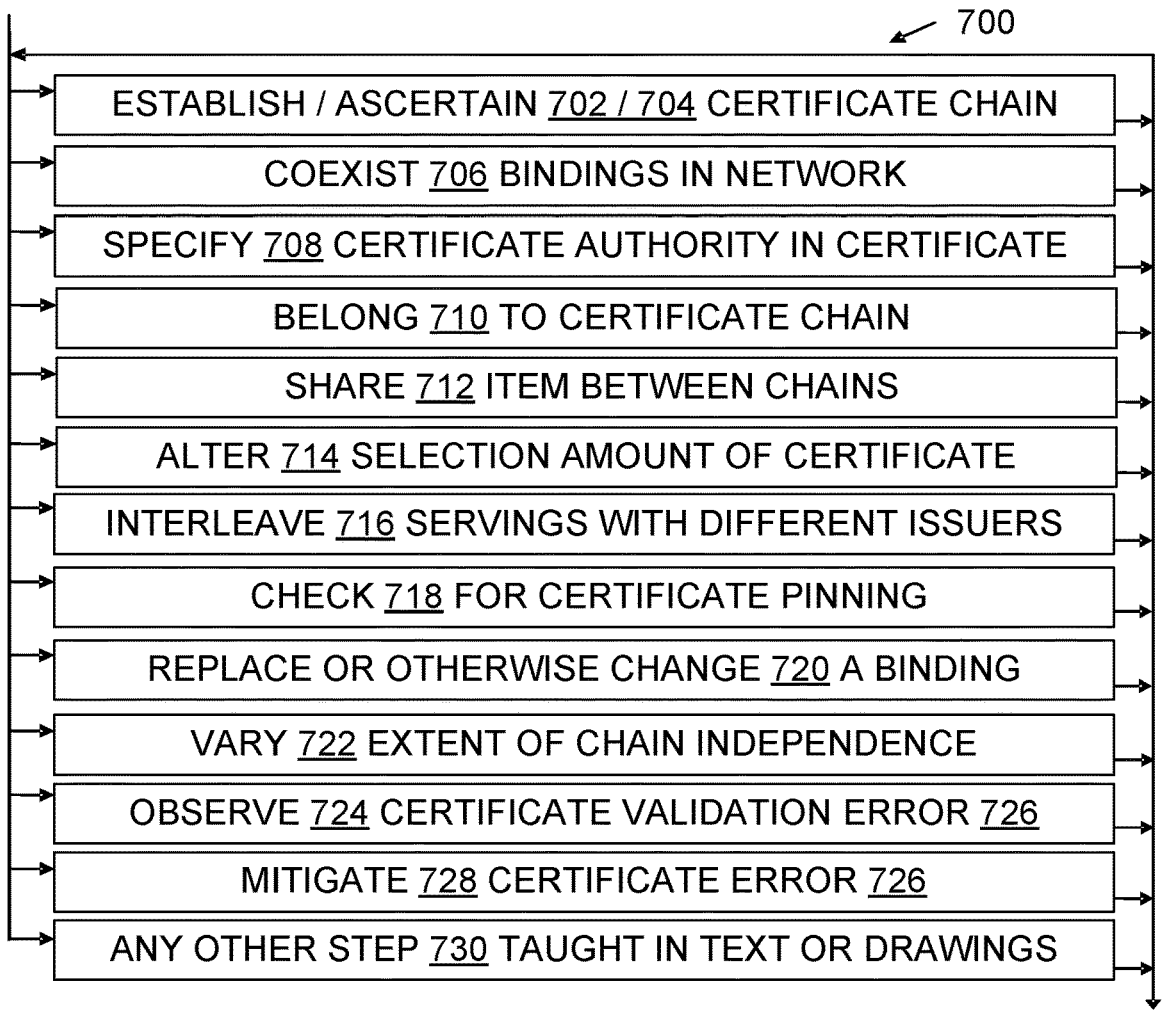
FIG. 7 is a flowchart further illustrating certificate management methods, and incorporating as options the steps of FIGS. 2, 3, 5, and 6.

The other figures are also relevant to systems 202. FIGS. 5 to 7 are flowcharts which illustrate methods of certificate management functionality 204 operation in some systems 202.

In some embodiments, the enhanced system 202 is networked through an interface 326. In some, an interface 326 includes hardware such as network interface cards, software such as network stacks, APIs, or sockets, combination items such as network connections, or a combination thereof.

Some embodiments include a computing system 202 which is configured to manage, in a computing network, certificates 130 issued by certificate authorities 402. The system 202 also includes a digital memory set 112 including at least one digital memory 112, and a processor set 110 including at least one processor 110. The processor set is in operable communication with the digital memory set. A digital memory set is a set which includes at least one digital memory 112, also referred to as a memory 112. The word "digital" is used to emphasize that the memory 112 is part of a computing system 102, not a human person's memory. The word "set" is used to emphasize that the memory 112 is not necessarily in a single contiguous block or of a single kind, e.g., a memory 112 may include hard drive memory as well as volatile RAM, and may include memories that are physically located on different machines 101. Similarly, the phrase "processor set" is used to emphasize that a processor 110 is not necessarily confined to a single chip or a single machine 101.

The processor set is configured by data and instructions to perform a certificate management method 700. The certificate management method 700 includes (a) establishing 702 or ascertaining 704 a first certificate chain 134 which includes a first binding 132 between a first certificate 130 issued by a first certificate authority 402 and an identity 404 in the computing network, such that the first certificate authority is specified in the first certificate, and the first certificate belongs to the first certificate chain, (b) establishing 702 or ascertaining 704 a second certificate chain 134 which includes a second binding 132 between a second certificate 130 issued by a second certificate authority 402 and the identity 404, such that the first binding and the second binding coexist 706 in the computing network, the second certificate authority is specified 708 in the second certificate, the second certificate belongs 710 to a second certificate chain 134, and the first certificate chain and the second certificate chain are independent 208 from one another in that: the certificate chains do not share 712 any root certificate 420 with each other, and the certificate chains do not share 712 any intermediate certificate authority certificate 418 with each other, (c) selecting 308 between the first certificate and the second certificate, and (d) serving 310 the selected certificate.

In some embodiments, the computing system 202 includes at least two certificate servers 214 in an active-active certificate server configuration 312. In some of these embodiments, a performance of the certificate management method 700 includes, within each of at least two periods 446 of no more than five minutes which are separated by at least ten minutes and separated by no more than thirty minutes, multiple instances of the active-active certificate server configuration serving 310 the first certificate interleaved 716 with multiple instances of the active-active certificate server configuration serving 310 the second certificate. More generally, serving certificates from a server A but not from a server B for a substantial period of time such as ten hours, and then serving certificates from server B but not from server A for the next ten hours, does not qualify as interleaved 716 servings 310 or as an active-active configuration 312 of server A and server B.

In some embodiments, the identity 404 includes at least one of: a domain name 406; an IP address 412; a port 408 identifier 410; a server name indication 422; or a client 442 identity 444. In particular, in some embodiments the identity 404 includes a server name indication 422.

In some embodiments, each of the certificate chains 134 is also independent 208 of each of the other certificate chains 134 in that no certificate in the certificate chain of one of the certificate authorities 402 is signed by a certificate of any other of the certificate authorities 402. In other words, in this version of chain independence 208 there is no cross-certification 424 between the chains, in either direction (either issuer X signed a certificate from issuer Y, or issuer Y signed a certificate from issuer X, or both).

In some embodiments, each of the certificate chains 134 is also independent 208 of each of the other certificate chains 134 in that the certificate chains do not share 712 any certificate revocation list (CRL) 434 with each other. In practice, each issuer usually will only place their own certificates in their CRLs. Perhaps the most efficient implementation of a check whether CRLs are shared 712 checks whether CRLs are from different certificate authorities (CAs); if they are, then the implementation determines there is no sharing 712. Another implementation of a check whether CRLs are shared 712 checks whether the same physical CRL is referenced in different chains; if it is, there is sharing. Another implementation compares the hashes or other identifiers of the certificates in two CRLs to determine whether the same certificate is identified in CRLs from different issuers; if it is, there is sharing.

In some embodiments, each of the certificate chains 134 is also independent 208 of each of the other certificate chains 134 in that the certificate chains do not share 712 any certificate revocation list (CRL) distribution point 436 with each other. A CRL Distribution Point (CDP) is a network path which has the CRL lists. If two issuers have the same CDP, they will both be impacted adversely if that CDP is down.

In some embodiments, each of the certificate chains 134 is also independent 208 of each of the other certificate chains in that the certificate chains do not share 712 any online certificate status protocol 430 endpoint 432 with each other.

In some embodiments, the computing system 202 includes at least two gateway machines 414, 214 in an active-active certificate server configuration 312, in which the at least two gateway machines are configured to perform the certificate management method 700. In line with the discussion above, serving certificates from a gateway A but not from a gateway B for a substantial period of time such as ten hours, and then serving certificates from gateway B but not from gateway A for the next ten hours, does not qualify as interleaved 716 servings 310 or as an active-active configuration 312 of gateway A and gateway B.

In some embodiments, the computing system 202 is further configured to verify 322 that the first certificate chain 134 and the second certificate chain 134 are independent 208 from one another. The criteria 320 for independence 208 vary between embodiments, and unless stated otherwise any combination of one or more independence criteria 320 noted herein are available for use in specifying an embodiment. In some embodiments, the verification 322 is done prior to serving 310 the selected certificate, or is done atomically with the selecting 308, or both.

Other system embodiments are also described herein, either directly or derivable as system versions of described processes or configured media, duly informed by the extensive discussion herein of computing hardware.

Although specific certificate management architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of certificate management functionality, for example, as well as different technical features, aspects, mechanisms, software, expressions, operational sequences, commands, data structures, programming environments, execution environments, environment or system characteristics, proxies, or other functionality consistent with teachings provided herein, and may otherwise depart from the particular examples provided.

Processes (a.k.a. Methods)

Processes (which are also be referred to as "methods" in the legal sense of that word) are illustrated in various ways herein, both in text and in drawing figures. FIGS. 5, 6, and 7 each illustrate a family of methods 500, 600, and 700 respectively, which are performed or assisted by some enhanced systems, such as some systems 202 or another certificate management functionality enhanced system as taught herein. Method families 500 and 600 are each a proper subset of method family 700. Moreover, activities identified in block diagrams in FIGS. 2 and 3 include method steps, e.g., getting 306 independent certificate chains, selecting 308 a certificate, serving 310 a selected certificate, measuring 318 issuer health, verifying 322 chain independence, and so on. These method steps are likewise incorporated into method (a.k.a. process) 700. These diagrams and flowcharts are merely examples; as noted elsewhere, any operable combination of steps that are disclosed herein may be part of a given embodiment when called out in a claim.

Technical processes shown in the Figures or otherwise disclosed will be performed automatically, e.g., by an enhanced system 202, unless otherwise indicated. Related non-claimed processes may also be performed in part automatically and in part manually to the extent action by a human person is implicated, e.g., in some situations a human 104 types or speaks in natural language an input such as a percentage 438 of certificate serving 310 instances that will serve a certificate from a particular chain 134. Such input is captured in the system 202 as digital text, or captured as digital audio which is then converted to digital text. Natural language means a language that developed naturally, such as English, French, German, Hebrew, Hindi, Japanese, Korean, Spanish, etc., as opposed to designed or constructed languages such as HTML, Python, SQL, or other programming languages. Regardless, no process contemplated as an embodiment herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 7. FIG. 7 is a supplement to the textual and figure drawing examples of embodiments provided herein and the descriptions of embodiments provided herein. In the event of any alleged inconsistency, lack of clarity, or excessive breadth due to an interpretation of FIG. 7, the content of this disclosure shall prevail over that interpretation of FIG. 7.

Arrows in process or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 700 action items are traversed to indicate the steps performed during a process may vary from one performance instance of the process to another performance instance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim of an application or patent that includes or claims priority to the present disclosure. To the extent that a person of skill considers a given sequence S of steps which is consistent with FIG. 7 to be non-operable, the sequence S is not within the scope of any claim. Any assertion otherwise is contrary to the present disclosure.

Some embodiments provide or utilize a method 700 of managing, in a computing network 108, certificates 130 issued by certificate authorities 402. This method includes automatically: establishing 702 or ascertaining 704 a first certificate chain 134 which includes a first binding 132 between a first certificate 130 issued by a first certificate authority 402 and an identity 404 in the computing network, such that the first certificate authority is specified 708 in the first certificate, and the first certificate belongs 710 to the first certificate chain; establishing 702 or ascertaining 704 a second certificate chain 134 which includes a second binding 132 between a second certificate 130 issued by a second certificate authority 402 and the identity 404, such that the first binding and the second binding coexist 706 in the computing network, the second certificate authority is specified 708 in the second certificate, the second certificate belongs 710 to a second certificate chain 134, and the first certificate chain and the second certificate chain are independent 208 from one another in that: the certificate chains do not share 712 any root certificate 420 with each other, and the certificate chains do not share 712 any intermediate certificate authority certificate 418 with each other; selecting 308 between the first certificate and the second certificate; and serving 310 the selected certificate. An issuer 314 is a certificate authority 402, e.g., as represented in a computing system, or a computational mechanism operating on behalf of a certificate authority 402.

In some embodiments, the method 700 further includes verifying 322 that the first certificate chain and the second certificate chain are independent from one another. Verifying 322 certificate chain independence is useful, for instance, as a precaution in case an admin tells the system which issuers to use but does not realize that the issuers' installed chains lack independence.

In some embodiments, verifying 322 is performed prior to serving 310 the selected certificate. In some embodiments, verifying 322 is performed atomically with the selecting 308. In some embodiments, verifying 322 is performed both prior to the serving 310 and atomically with the selecting 308.

In some embodiments, selecting 308 between the first certificate and the second certificate includes selecting according to at least one of: a percentage 438 allocated to the chain of the selected certificate; a topology 450 of the computing network; or a random or quasi-random variable 440.

In some embodiments, the method 700 further includes detecting 502 that one of the issuers 314 is an unhealthy issuer according to a health metric 318, and the selecting 308 does not select a certificate that is in a chain of the unhealthy issuer. The term "unhealthy" includes both degraded performance and complete failure.

In many scenarios, choosing an issuer 314 corresponds to choosing a chain 134, and vice versa. However, an embodiment may also have a set of multiple chains for a particular issuer. Those chains are not independent of one another, but all chains of a first issuer are each independent of every chain of a second issuer. The second issuer may likewise have a set of multiple chains. Then, selections 308 in an active-active configuration would choose one chain from the first issuer's set of chains, and then choose another chain from the second issuer's set of chains, when implementing a distribution of certificates between the two issuers.

In some embodiments, over multiple instances of the selecting 308, the method incrementally alters 714 a selection percentage 438 of a particular issuer 314. For example, in one scenario the percentage of servings 310 of a certificate from a chain B does up by one percent per hour from zero percent to thirty percent, unless certificate problems are reported in which case the percent is reduced back to zero until the certificate problems are diagnosed and a mechanism is in place to prevent their reoccurrence.

Configured Storage Media

Some embodiments include a configured computer-readable storage medium 112. Some examples of storage medium 112 include disks (magnetic, optical, or otherwise), RAM, EEPROMS or other ROMs, and other configurable memory, including in particular computer-readable storage media (which are not mere propagated signals). In some embodiments, the storage medium which is configured is in particular a removable storage medium 114 such as a CD, DVD, or flash memory. A general-purpose memory, which is be removable or not, and is volatile or not, depending on the embodiment, can be configured in the embodiment using items such as certificate management 302 software 304, issuer health metrics 318, issuer selection amounts 324, chain independence criteria 320, identities 404, certificates 130, certificate chains 134, certificate bindings 132, and certificate issuer migration commands 454, in the form of data 118 and instructions 116, read from a removable storage medium 114 and/or another source such as a network connection, to form a configured storage medium. The foregoing examples are not necessarily mutually exclusive of one another. The configured storage medium 112 is capable of causing a computer system 202 to perform technical process steps for providing or utilizing certificate management functionality 204 as disclosed herein. The Figures thus help illustrate configured storage media embodiments and process (a.k.a. method) embodiments, as well as system and process embodiments. In particular, any of the method steps illustrated in FIGS. 5 to 7, or otherwise taught herein, may be used to help configure a storage medium to form a configured storage medium embodiment.

Some embodiments use or provide a computer-readable storage device 112, 114 configured with data 118 and instructions 116 which upon execution by a processor 110 cause a computing system 202 to perform a method 700 of managing, in a computing network 108, certificates 130 issued by certificate authorities 402. This method 700 includes automatically: establishing 702 or ascertaining 704 a first certificate chain which includes a first binding between a first certificate issued by a first certificate authority and an identity in the computing network, such that the first certificate authority is specified 708 in the first certificate, and the first certificate belongs 710 to the first certificate chain; establishing 702 or ascertaining 704 a second certificate chain which includes a second binding between a second certificate issued by a second certificate authority and the identity, such that the first binding and the second binding coexist 706 in the computing network, the second certificate authority is specified 708 in the second certificate, the second certificate belongs 710 to a second certificate chain, and the first certificate chain and the second certificate chain are independent 208 from one another in that the certificate chains do not share 712 any root certificate with each other; selecting 308 between the first certificate and the second certificate; and serving 310 the selected certificate.

In some embodiments, the method 700 further includes checking 718 for a certificate pinning.

In some embodiments, the method 700 further includes establishing 702 or ascertaining 704 a third certificate chain which includes a third binding between a third certificate issued by a third certificate authority and the identity, such that each of the certificate chains is independent 208 of each of the other certificate chains.

In some embodiments, the method 700 further includes changing 720 a binding of a web server 448 atomically at runtime to include the selected 308 certificate.

In some embodiments, selecting 308 between the first certificate and the second certificate includes selecting according to at least a topology 450 of the computing network. When an embodiment is selecting 308 according to a topology of a computing network, various scenarios are followed according to the embodiment and any settings or configuration choices. In some cases, the relevant topology specifies geographic regions. In some cases, the relevant topology specifies roles, such as worker, controller, primary, secondary, principal, or agent roles, for servers or other nodes, or for replicas. For instance, in one scenario a configuration file 456 specifies that primary node certificates be independent 208 of secondary node certificates.

Additional Observations

Additional support for the discussion of certificate management functionality 204 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, best mode, novelty, nonobviousness, inventive step, or industrial applicability. Any apparent conflict with any other patent disclosure, even from the owner of the present subject matter, has no role in interpreting the claims presented in this patent disclosure. With this understanding, which pertains to all parts of the present disclosure, examples and observations are offered herein.

Without the benefit of teachings herein, one possible cause of certificate validation errors 726 when connecting to cloud services has been expiration of an Intermediate Certificate Authority (ICA) certificate. Many ICA certificates have lifespans of five or ten years, so expiration of an ICA cert is not a frequent event. In some scenarios, however, such an expiration is potentially quite damaging.

Assume that a reverse proxy fronting cloud-based services is sending a valid certificate bundle in the TLS handshake. Even so, clients that cached or pinned to an expired ICA certificate and subsequently used it for chain validation would observe certificate validation failures 726. When an entire server fleet is presenting expired certificates, the blast radius would be large, even potentially global. When no safe automatic mitigation strategies could be applied on the server side, support personnel could do little if anything more than send out comms recommending that customers flush their client caches to drop the expired ICA certificate and recommending that customers ensure the latest root and intermediate certificates are installed on their machines.

In general, certificate failures are single points of failure with a global blast radius throughout the network that relied on the failed certificates, and no safe server-side mitigation strategies have been evident.

Certificate expiration is a cause of certificate errors, so one approach to reducing such errors is improved tracking of certificate renewal deadlines. Many teachings herein are compatible with expiration date tracking, and therefore can be applied alongside expiration tracking and renewal solutions.

However, certificate expiration tracking is not the only way to reduce or avoid certificate problems. Indeed, certificate expiration is not the only potential certificate problem, e.g., a software or hardware or network problem encountered during an attempt to validate a certificate can also cause severe damage. Typically, server architectures have presented certificates from a single issuer. An expiry in the Root or ICA certificates for that issuer can have multi-region impact and cause a complete service outage.

Some embodiments taught herein provide or utilize a fault-tolerant certificate server architecture. To improve service resiliency against failures in one issuer, according to some of the teachings herein a server fleet will support serving certificates from multiple different issuers for the same server name indication (SNI) or domain name. In particular, some embodiments serve TLS certificates from multiple isolated certificate authorities for the same SNI or domain.

This certificate management architecture provides several benefits.

One benefit is reduction of the blast radius of certificate failures. The more issuers are active in a network certificate serving service, the more resilient the service. If a service uses certificates from N issuers in roughly equal amounts, then a failure in one issuer will at most impact 1/N of the service's fleet.

Another benefit is a quick and safe server-side mitigation for certificate failures. Assume each server has certificates from all N issuers installed, where N is two or greater. During a certificate failure for an issuer X, all servers that were presenting certificates from that issuer X can dynamically switch 720 to a different issuer Y (or Z, etc.). By changing the certificate bindings on the affected servers, the faulty issuer will be disabled and the server will fallback to another issuer that is healthy. Note that "faulty issuer" is short for "issuer of certificates which are causing validation failures or other faults" and "issuer" means an issuer as represented digitally in a network or other computing system, not a company per se.

Some embodiments optimize a multi-issuer certificate setup 202 by specifying and enforcing particular certificate chain independence criteria 320. For example, some embodiments require that the certificates of different certificate chains are from different issuers 314 that are both physically and logically isolated. Some criteria 320 require trust chains be isolated from one another in that they not share 712 any Root or ICA certificates. Some criteria 320 require that issuer chains cannot be cross-certified 424, meaning that a certificate from one issuer in a dual-chain architecture 204 cannot be cross-signed by a certificate from the other issuer. Some criteria 320 require that issuer chains not share 712 any dependencies, such as Certificate Revocation Lists (CRLs) or Online Certificate Status Protocol (OCSP) endpoints.

In a given network, each enforced independence criterion 320 improves the resiliency of the network by reducing opportunities for certificate problems, such as only having an expired ICA certificate available for TLS operations. A failure in a given system that validates certificates only impacts a single issuer's chains, leaving the other issuer's certificates as a valid fallback.

Some embodiments implement a multi-issuer setup 202 with a web server 448 using an active-active configuration 312 in which two or more issuer certificates are all actively served 310 for the same domain 406 by different server machines within the same time frame, e.g., such that serving instances by different server machines (and hence with different chains in this scenario) are interleaved over a sample period of one hour. Therefore, a failure in one issuer's chain or one issuer's health will only impact a subset of the service's fleet. This active-active configuration 312 also ensures that all issuer certificates are continually being exercised, monitored, and validated by clients within a given period, e.g., one hour.

Some embodiments implement an active-active multi-certificate setup 202 in part by configuring a web server 448 to manage a configuration 456 of TLS bindings. The bindings configuration 456 defines which server certificates are bound to which domains 406. In some embodiments, a bindings configuration supports selecting 308 different issuers to select 308 a certificate based on a percentage distribution 438. In some, the bindings configuration supports selecting 308 different issuers in order to select 308 a certificate according to a topology-based distribution 450.

In some embodiments, a percentage distribution 438, 324 provides an embodiment with control over the percentage of service 310 instances in which each issuer's certificate is used. For example, one scenario configures different server nodes 102 to present a certificate from one of three issuers, each with equal probability of about 33%. This ensures that a single-issuer failure will only impact a third of the fleet.

In some embodiments, under a topology-based distribution 450, the issuer is chosen 308 according to one or more aspects of a served network's topology. For example, in one scenario the certificate service is serving two cloud regions 458, and each region's nodes 102 are bound to a different issuer. Then, during a single-issuer failure, at most a single region is affected, and the affected region's traffic is failed over into the other healthy region.

Some embodiments do more than serving certificates from multiple issuers. In some, the certificate serving service is able to dynamically switch issuers, e.g., with the switch taking effect without a virtual machine reboot and without an application restart. Therefore, if one issuer's certificate is observing failures, the server is able to stop presenting 310 that issuer's certificates, and fully serve another issuer's certificates instead. This is done by an automatic system 202 that detects 502 failures related to a single issuer and triggers a fleet-wide dynamic certificate binding change 720. In some embodiments, the TLS bindings configuration change 456 is rolled out to all servers to trigger a dynamic binding change 720 in under ten minutes.

Some Microsoft Windows® environments support changing TLS bindings of a web server atomically at runtime, so clients in an embodiment according to teachings herein will receive either the old binding or the new binding, with no failure interval in between. This capability is exposed through a Native API HttpUpdateServiceConfiguration. In the context of certificate management as taught herein, a server fleet is able to completely disable a failing issuer quickly, safely, and without losing any capacity.

If a multi-issued TLS certificate setup 202 as taught herein had been available when the ICA certificate expired in the scenario above, an outage and other damage could have been prevented. Suppose gateway or other servers had three certificates installed for a mission-critical domain. All the certificates would have had the same subject name and SAN (Subject Alternative Name) list, but would have been issued by different, isolated issuers, e.g., Issuer1, Issuer2, and Issuer3. Each server would have been presenting certificates from one of these issuers. When the Issuer1 ICA certificate expired, the blast radius would have been limited to only a subset (e.g., 33%) of clients, namely, those sending requests to the servers that were serving certificates tied to the expired ICA certificate.

Then, as a mitigation 728, through an automatic binding change those affected servers would have dynamically disabled the expired ICA certificate and presented instead certificates from Issuer2 or Issuer3. Those Issuer2 and Issuer3 certificates would have already been installed on the servers. Issuer2 and Issuer3 chains would be unaffected by the expired Issuer1 ICA certificate, because of the independence 208 criteria enforcement. Therefore, clients who saw the Issuer2 and Issuer3 fallback certificates would have been able to validate them and successfully connect to the services. This would mitigate 728 the incident quickly by stopping certificate validation failures without introducing any further risk.

By contrast, consider a cloud service that does not utilize a multi-issued certificate setup for any domain, such as a cloud service X that relies on its own CAs and has a single root CA for all the certificates for cloud service X endpoints. If that root CA expires, or any dependency of the CA fails, cloud service X faces a substantial risk of a global service outage for all its endpoints.

Depending on the embodiment, this risk is mitigated or avoided completely by establishing multi-issued TLS certificates as a pattern across cloud services, providing increased resiliency against certificate failures. For example, some embodiments implement a computer networking method, which includes: determining that a networking failure involving a domain served by a server is caused at least in part by a certificate authority certificate issued by a certificate issuer and bound to the domain at the server; automatically and proactively changing a certificate binding at the server so the domain is bound instead to a different certificate from a different certificate issuer; and continuing to serve the domain at the server using the different certificate.

Some embodiments implement a multi-issued certificate setup 202 in reverse proxies which front directory services, e.g., Microsoft Active Directory® services or Microsoft Entra ID™ services, or the like. Some embodiments implement a multi-issued certificate setup in reverse proxies which front API-based services. More generally, any service that utilizes certificates to prove identity will gain improved resiliency through a multi-issued certificate setup as taught herein.

Some embodiments use a multi-issued certificate setup with completely isolated issuers for each of multiple domains 406, which increases the resiliency of those domains against certificate problems. Some embodiments serve all issuer certificates through an active-active setup, which limits the blast radius of impact due to a certificate failure. Some embodiments install certificates from different issuers on all server machines, which allows mitigating a certificate failure quickly and safely through a binding change. Some embodiments support customizing or auto-changing Root certificate or ICA certificates or both, when issuing certificates or when rolling over certificates to avoid impending expiration, or both, which permits fine-tuning while creating 702 certificate chains that do not overlap. In some other cases, Root CAs and ICAs are chosen randomly for new certificates. Some embodiments combine these illustrative mechanisms and steps.

Some embodiments use an active-active configuration, meaning the two or more issuer certificates will all be actively served by different gateway machines at the same time. This helps ensure that each issuer's certificates are monitored, up, and healthy. By contrast, in an active-passive configuration, the passive provider is rarely exercised and is unmonitored, leaving the possibility that during a disaster scenario, the backup issuer might also be broken.

To implement active-active, in some embodiments a bindings configuration file 456 supports picking 308 different providers 314 for a certificate 130 based on a percentage distribution 438, 324. For example, one embodiment configures different gateway nodes to bind a dual-cert domain to a first cert from a first provider 50% of the time and bind to a second cert from a second provider the other 50% of the time. As a result, if a client establishes two TLS sessions back-to-back (e.g., within ten seconds of each other), it is possible that each TLS session will receive a different certificate. Under this active-active configuration, a client can receive two different certificates on consecutive TLS handshakes. Different new client connections could route to different gateway nodes, which have different certificate bindings configured.

More generally, the bindings configuration file 456 controls the percentage or group of places where each provider is used. An embodiment can gradually enable new providers 314 and gradually disable bad providers if needed. Upon any binding failure, the node will fall back to the other providers until successful certificate validation occurs. Some embodiments emit telemetry for visibility into which certificate or provider a node chose.

In some embodiments, a bindings configuration file 456 is implemented using a data structure such as the following:

<sslBindingDefinition hostname="login.contoso.com" certSubject="login. contoso.com">
  <issuers>
    <issuer Name="Issuer1" IssuerNameContainsAny="Issuer1" SelectionPercentage="50"/>
    <issuer Name="Issuer2" IssuerNameContainsAny="Issuer2" SelectionPercentage="50"/>
  </issuers>
</sslBindingDefinition>

Although this example sslBindingDefinition data structure shows two issuer slots, in a given embodiment the bindings configuration file 456 specifies two or more issuers 314 to choose from.

Although this example sslBindingDefinition data structure shows a distribution giving each issuer the same percentage, in some embodiments the bindings configuration file 456 specifies different percentages, e.g., a distribution with 80% for Issuer1 and 20% for Issuer2, or a distribution with 60% for Issuer1, 30% for Issuer2, and 10% for Issuer3.

Although this example sslBindingDefinition data structure shows a percentage distribution, in some embodiments the bindings configuration file 456 specifies a topology distribution.

One of skill will also understand that a given machine 101 that serves certificates may be running one or more servers 214. Also, the number of issuers 314 is not necessarily the same as the number of servers 214.

In some embodiments, if a specified issuer's certificate is not located, the selection 308 falls back to an existing certificate for the domain in question. Independent certificates are preferred, but even a non-independent certificate is preferred over no certificate at all in many scenarios.

In some embodiments, a bindings configuration file 456 specifies which issuers 314 to choose from, and specifies constraints that guide issuer selection 308, e.g., which issuer to pick for an SNI binding. The bindings configuration file specifies an issuer distribution, such as a percentage distribution constraint (illustrated in the sslBindingDefinition data structure above) or a topology-based distribution constraint.

Rolling out new provider certificates into a system could break some existing clients that have pinned to the current provider certificates. For example, a client might have pinned the login dot contoso dot com domain to an Issuer2 certificate or public key. When the network starts using a different provider 314 for this domain, that client will fail the TLS handshake. Therefore, some approaches carefully orchestrate a safe deployment practices (SDP) rollout with thorough testing and monitoring. Some rollouts include the following steps.

Perform pre-mortem outside-in analysis to identify failure scenarios and which sets of clients are vulnerable. Consider, e.g., various TLS implementations, trusted CAs, operating systems, browsers, and network appliances.

Send out advisories to inform directory service clients of the new provider(s). Some suitable advisories mention which subsets of customers are more likely to be affected. Some suitable advisories include a call to action, such as executing tools 122 which scan 718 for any certificate pinning 428, e.g., in configuration files, source code, log files, and encouraging removal of any certificate pinning found, to help ensure clients will trust the new provider(s).

Roll out the new provider certificate to a few gateway machines. Perform automated and focused monitoring for fine-grained traffic loss, such as a decrease in traffic for a cloud tenant, an application 124, or a user agent. Monitor for customer reported incidents (CRIs) involving certificates 130.

Continue SDP rollout by leveraging the configuration support for per-provider percentages. While monitored rollout is successful, gradually increase the new provider percentage across a fleet until distributions reach a target, e.g., by 5% increments over a two-week period to reach an equal provider distribution of 50% for each of two providers 314.

If problems occur, pursue a mitigation strategy based on the scope of impact. For instance, failover gateway nodes with a new provider, or rollback the new provider by rolling out a binding configuration change to multiple nodes, or work with affected clients admins to remove certificate pinning and enable them to trust a new provider.

With regard to dynamic switching at runtime, in some systems 102 a bindings configuration file is a control mechanism interface which specifies which provider a gateway chooses at startup. Some embodiments also support modifying this binding file during runtime. During a disaster scenario where certificates from a specific provider should no longer be served, a bindings configuration file update is rolled out to an entire fleet. In some environments this rollout is accomplished in no more than five minutes.

As a particular example, some Microsoft Windows® environments support changing HTTP bindings of a web server atomically at runtime. That means clients will receive either the old bindings or the new bindings, with no failure interval in between. This capability is exposed through a native method HttpUpdateServiceConfigurationSni, as illustrated by the following code snippet:

[DllImport("httpapi.dll",
  EntryPoint="HttpUpdateServiceConfiguration",
  CharSet=CharSet.Unicode, ExactSpelling=true,
  CallingConvention=CallingConvention.StdCall)]
internal static extern uint HttpUpdateServiceConfigurationSni (IntPtr serviceHandle,
  HTTP_SERVICE_CONFIG_ID configID, // IntPtr
    pInputConfigInfo ref HTTP_SERVICE_CONFIG_SSL_SNI_SET configInfo, uint InputConfigInfoLength, IntPtr pOverlapped);

In some embodiments, after a new binding configuration is rolled out the gateway which received the new binding configuration will re-evaluate servings 310 distribution for compliance with the new percentages, for all updated dual-chain bindings. If a new provider is chosen, the gateway will use HttpUpdateServiceConfigurationSni or a similar API with software 304 to update the binding at runtime. This allows an embodiment to completely stop usage of a specific provider, and to implement that stoppage quickly, safely, and without losing any capacity. Some embodiments also log errors.

Internet of Things

In some embodiments, the system 202 is, or includes, an embedded system such as an Internet of Things system. "IoT" or "Internet of Things" means any networked collection of addressable embedded computing or data generation or actuator nodes. An individual node is referred to as an internet of things device 101 or IoT device 101 or internet of things system 102 or IoT system 102. Such nodes are examples of computer systems 102 as defined herein, and may include or be referred to as a "smart" device, "endpoint", "chip", "label", or "tag", for example, and IoT may be referred to as a "cyber-physical system". In the phrase "embedded system" the embedding referred to is the embedding a processor and memory in a device, not the embedding of debug script in source code.

IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage-RAM chips or ROM chips provide the only local memory; (e) no CD or DVD drive; (f) being embedded in a household appliance or household fixture; (g) being embedded in an implanted or wearable medical device; (h) being embedded in a vehicle; (i) being embedded in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

Technical Character

The technical character of embodiments described herein will be apparent to one of ordinary skill in the art, and will also be apparent in several ways to a wide range of attentive readers. Some embodiments address technical activities such as serving 310 digital certificates 130 in a computing network 108, configuring 456 digital data structure bindings 132 between certificates 130 and digital identities 404 such as domain names 406 or IP addresses 412, and migrating 452 a server 214 from one certificate chain 134 to another certificate chain 134, which are each an activity deeply rooted in computing technology. Some of the technical mechanisms discussed include, e.g., certificate management software 304, independent 208 certificate chains 134, servers 214, bindings 132, and binding configurations 456. Some of the technical effects discussed include, e.g., increased computing network 108 resiliency against certificate 130 expiration, increased computing network 108 resiliency against certificate issuer 314 health 316 problems, dynamic updates 720 to a distribution of certificate service instances 310 in a computing network 108, percentage-based distribution of certificate service instances 310 in a computing network 108, and topology-based distribution of certificate service instances 310 in a computing network 108. Thus, purely mental processes and activities limited to pen-and-paper are clearly excluded from the scope of any embodiment. Other advantages based on the technical characteristics of the teachings will also be apparent to one of skill from the description provided.

One of skill understands that certificate 130 serving 310 in a computing network 108 is technical activity which cannot be performed mentally at all, and cannot be performed manually with the speed and accuracy required in computing systems, particularly in computing systems which communicate electronically with the internet generally, or with the world wide web portion of the internet in particular, e.g., using HTTPS. Hence, certificate 130 serving 310 technology improvements such as functionality 204 described herein are improvements to computing technology. One of skill understands that attempting to manually select a certificate to serve would create unacceptable delays in program execution, pose severe reputation risks, and introduce a severe risk of unacceptable human errors. People manifestly lack the speed, accuracy, memory capacity, and specific processing capabilities required to perform certificate management as taught herein.

Different embodiments provide different technical benefits or other advantages in different circumstances, but one of skill informed by the teachings herein will acknowledge that particular technical advantages will likely follow from particular embodiment features or feature combinations, as noted at various points herein. Any generic or abstract aspects are integrated into a practical application such as a reverse proxy or another server 214.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not.

Rather, the present disclosure is focused on providing appropriately specific embodiments whose technical effects fully or partially solve particular technical problems, such as how to reduce or avoid service outages due to certificate expiration, how to reduce or avoid certificate errors during migration from one certificate authority to another certificate authority, and how to mitigate certificate validation failures. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, language models, prompts, motivating examples, operating environments, tools, peripherals, software process flows, identifiers, repositories, data structures, data selections, naming conventions, notations, control flows, or other implementation choices described herein. Any apparent conflict with any other patent disclosure, even from the owner of the present subject matter, has no role in interpreting the claims presented in this patent disclosure.

Note Regarding Hyperlinks

Portions of this disclosure refer to domain names, URLs, hyperlinks, IP addresses, and/or other items which might be considered browser-executable codes. These items are included in the disclosure for their own sake to help describe some embodiments, rather than being included to reference the contents of the web sites or files that they identify. Applicants do not intend to have any domain names, URLs, hyperlinks, IP addresses, or other such codes be active links in this disclosure. None of these items are intended to serve as an incorporation by reference of material that is located outside this disclosure document. Thus, there should be no objection to the inclusion of these items herein. To the extent these items are not already disabled, it is presumed the Patent Office will disable them (render them inactive as links) when preparing this document's text to be loaded onto its official web database. See, e.g., United States Patent and Trademark Manual of Patent Examining Procedure § 608.01 (VII).

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
LAN: local area network
OS: operating system
PaaS or PAAS: platform-as-a-service
RAM: random access memory
ROM: read only memory
TPU: tensor processing unit
UEFI: Unified Extensible Firmware Interface
UI: user interface
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Sharing a reference numeral does not mean necessarily sharing every aspect, feature, or limitation of every item referred to using the reference numeral. Omission of a reference numeral from a given piece of text does not necessarily mean that the content of a Figure is not being discussed by the text. The present disclosure asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin (x)) or it may simply return without also providing a value (e.g., void functions).

"Service" as a noun means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Herein, activity by a user refers to activity by a user device or activity by a user account, or by software on behalf of a user, or by hardware on behalf of a user. For this purpose, and issuer 314 is an example of a user 104. Activity is represented by digital data or machine operations or both in a computing system. Activity within the scope of any claim based on the present disclosure excludes human actions per se. Software or hardware activity "on behalf of a user" accordingly refers to software or hardware activity on behalf of a user device or on behalf of a user account or on behalf of another computational mechanism or computational artifact, and thus does not bring human behavior per se within the scope of any embodiment or any claim.

"Digital data" means data in a computing system, as opposed to data written on paper or thoughts in a person's mind, for example. Similarly, "digital memory" refers to a non-living device, e.g., computing storage hardware, not to human or other biological memory.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" may also be used as a patent law term of art, e.g., in describing a process claim as opposed to a system claim or an article of manufacture (configured storage medium) claim. Similarly, "method" is used herein primarily as a technical term in the computing science arts (a kind of "routine") but it is also a patent law term of art (akin to a "method"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Certificate management operations such as serving 310 a selected certificate 130, and many other operations discussed herein (whether recited in the Figures or not), are understood to be inherently digital. A human mind cannot interface directly with a CPU or other processor, or with RAM or other digital storage, to read and write the necessary data to perform the certificate management steps 700 taught herein even in a hypothetical or actual prototype situation, much less in an embodiment's real world large computing environment, e.g., an internet-connected environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user, and indicates machine activity rather than human activity. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

"At least one" of a list of items means one of the items, or two of the items, or three of the items, and so on up to and including all N of the items, where the list is a list of N items. The presence of an item in the list does not require the presence of the item (or a check for the item) in an embodiment. For instance, if an embodiment of a system is described herein as including at least one of A, B, C, or D, then a system that includes A but does not check for B or C or D is an embodiment, and so is a system that includes A and also includes B but does not include or check for C or D. Similar understandings pertain to items which are steps or step portions or options in a method embodiment. This is not a complete list of all possibilities; it is provided merely to aid understanding of the scope of "at least one" that is intended herein.

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this disclosure discusses various data values and data structures, and recognize that such items reside in a memory (RAM, disk, etc.), thereby configuring the memory. One of skill will also recognize that this disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as altering, ascertaining, belonging, changing, checking, coexisting, configuring, detecting, establishing, executing, getting, interleaving, mitigating, observing, receiving, replacing, selecting, serving, sharing, specifying, varying, verifying (and alters, altered, ascertains, ascertained, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest. Example verbs listed here may overlap in meaning or even be synonyms; separate verb names do not dictate separate functionality in every case.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other storage device or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory and computer readable storage devices are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe aspects of embodiments by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

- 100 operating environment, also referred to as computing environment; includes one or more systems 102
- 101 machine in a system 102, e.g., any device having at least a processor 110 and having a distinct identifier such as an IP address or a MAC (media access control) address; may be a physical machine or be a virtual machine implemented on physical hardware
- 102 computer system, also referred to as a "computational system" or "computing system", and when in a network may be referred to as a "node"
- 104 users, e.g., user of an enhanced system 202
- 106 peripheral device
- 108 network generally, including, e.g., LANs, WANs, software-defined networks, clouds, and other wired or wireless networks
- 110 processor or set of processors; includes hardware
- 112 computer-readable storage medium, e.g., RAM, hard disks; also referred to as storage device
- 114 removable configured computer-readable storage medium
- 116 instructions executable with processor; may be on removable storage media or in other memory (volatile or nonvolatile or both)
- 118 digital data in a system 102; data structures, values, source code, and other examples are discussed herein
- 120 kernel(s), e.g., operating system(s), BIOS, UEFI, device drivers; also refers to an execution engine such as a language runtime
- 122 software tools, software applications, security controls; hardware tools; computational
- 124 application, may also be referred to as an app; software
- 126 display screens, also referred to as "displays"
- 128 computing hardware not otherwise associated with a reference number 106, 108, 110, 112, 114
- 130 digital certificate, e.g., X.509 certificate; also referred to as "cert"
- 132 binding between a certificate and an identity, as represented or effectuated in a computing system
- 134 certificate chain, may also be referred to as a chain of trust; as represented or effectuated in a computing system includes an ordered list of one or more certificates that link an identity (e.g., server) certificate to a certificate authority; unless indicated otherwise, each chain includes multiple certificates and includes a root certificate; certificates in a chain are issued by certificate authorities
- 136 cloud, also referred to as cloud environment or cloud computing environment
- 202 enhanced computing system, i.e., system 102 enhanced with functionality 204 as taught herein; also referred to as a "setup"
- 204 certificate management functionality (also referred to as the particular example dual-chain architecture 204, or as functionality 204), e.g., software or specialized hardware which performs or is configured to perform steps 306, 308, and 310, or steps 702, 308, and 310, or steps 704, 308, and 310, or step 716, or any software or hardware which performs or is configured to maintain 206 certificate independence or to perform a novel method 700 or a computational certificate management functionality activity first disclosed herein 206 computationally maintain certificate independence, e.g., by one or more of: deinstalling a certificate chain which is not independent of another installed certificate chain, modifying a certificate chain which is not independent of another installed certificate chain by making a certificate substitution which results in the chains being independent, or verifying that a certificate chain is independent before installing that certificate chain 208 independence of two or more certificate chains from one another, by reason of compliance with one or more independence criteria; which criteria apply varies according to the embodiment, to a setting in the embodiment, or both 210 certificate selector, e.g., software which selects 308 a certificate based on at least independence 208 by avoiding selection of non-independent certificates; in some embodiments selection 308 is also based on a target distribution specified in a binding configuration 456; in some embodiments the certificate selector is an integral part of certificate management software 304

212 selection criteria, e.g., independence criteria 320, a target distribution specified in a binding configuration 456, or both, as represented or effectuated in a computing system 214 server; includes software, or software and hardware 216 selected certificate, i.e., certificate 130 which is selected 308 for serving according to selection criteria 212

302 certificate management generally in a computing network 108, including installing, modifying, de-installing, selecting, serving, transmitting, receiving, validating, or renewing a certificate 130

304 certificate management software, i.e., software which upon execution performs any sequence implementing functionality 204, including any sequence shown in FIG. 3

306 computationally get a certificate chain, e.g., by establishing 702 the chain through installation or modification, or by ascertaining 704 a previously established chain 308 computationally select a certificate; implicitly also selects a certificate chain the certificate belongs to, and implicitly also selects an issuer of the certificate and an issuer of any certificate in the same chain as the certificate; also referred to as picking or choosing; 308 also refers to a selection resulting from such activity 310 computationally serve a certificate, e.g., as part of a TLS handshake; also refers to a service which performs serving 310, e.g., via an API 312 server configuration, e.g., active-active or active-passive; presumed active-active if not stated otherwise 314 issuer of a certificate, as represented in a computing network, e.g., a certificate authority identified in a TLS certificate as an issuer of the certificate 316 health of an issuer or other entity in a computing network, as represented in the network and measured by a metric 318; also referred to as a certificate provider 318 health metric, e.g., TCP socket metrics, network bandwidth, network latency, errors, timeouts, etc.; also refers to computational activity of measuring health 320 chain 134 or certificate 130 or issuer 314 independence criteria, as represented or effectuated in a computing system 322 computationally verifying independence 208; also refers to software which performs such computational activity 324 issuer selection amount, also referred to as selection 308 distribution or serving 310 distribution 326 interface in a computing system, e.g., user interface, device control interface, program-to-program interface such as an API 402 certificate authority, as represented or effectuated in a computing system 404 identity in a certificate 130 or a certificate binding 132, as represented or effectuated in a computing system 406 domain name, as represented or effectuated in a computing system 408 port in a computing system, as represented or effectuated in the computing system 410 port 408 identifier, as represented or effectuated in a computing system 412 IP address, e.g., IPv4 address or IPv6 address, as represented or effectuated in a computing system 414 gateway software or gateway machine in a computing network 416 intermediate certificate authority (ICA), as represented or effectuated in a computing system 418 certificate 130 issued by an ICA 416

420 root certificate, e.g., certificate 130 issued by a root certificate authority, which is a topmost CA 402 in a chain 134

422 server name indication, as represented or effectuated in a computing system 424 computational activity of certificate cross-certification or result thereof in a computing system 428 computational activity of certificate pinning or data implementing an instance of such pinning or a result thereof in a computing system 430 computational activity of performing online certificate status protocol (OCSP) or data implementing an instance of such protocol or a result thereof in a computing system 432 OCSP endpoint in a computing network 434 certificate revocation list (CRL) in a computing network 436 CRL distribution endpoint in a computing network 438 percentage, ratio, or fraction with respect to service instances 310 or issuers 314 or chains 134 or a set of independent certificates 130; also refers to a kind of distribution of the foregoing, e.g., pursuant to a binding configuration 456

440 variable in a computing system 442 client software or machine in a computing network 444 identity 404 of a client 442, as represented or effectuated in a computing system 446 time period, as represented or effectuated in a computing system 448 web server software or machine in a computing network 450 aspect of network topology; also refers to a distribution of service 310 instances or issuers 314 or chains 134 or a set of independent certificates 130 which is computed according to an aspect of network topology, e.g., pursuant to a binding configuration 456 which divides certificates to serve multiple regions with respective certificates 130 that are independent 208 of one another 452 computational activity of migrating by changing a distribution of service instances 310 or issuers 314 or chains 134 or a set of independent certificates 130 in at least three increments over a period of at least twenty-four hours, or data implementing an instance of such activity or a result thereof in a computing system; the increments are not necessarily all the same size, and the intervals between the changes are not necessarily all the same duration 454 command to perform migration 452, e.g., command to comply a network with three or more updated binding configurations 456 over time 456 identity-certificate binding configuration, as represented or effectuated in a computing system 458 cloud region, as represented or effectuated in a computing system 500 flowchart; 500 also refers to certificate management methods that are illustrated by or consistent with the FIG. 5 flowchart or any variation of the FIG. 5 flowchart described herein 502 computationally detect an unhealthy issuer or other node in a certificate validation path, e.g., by monitoring metric telemetry against predetermined health thresholds 600 flowchart; 600 also refers to certificate management methods that are illustrated by or consistent with the FIG. 6 flowchart or any variation of the FIG. 6 flowchart described herein 602 computationally receive a migration 452 command, e.g., via an API 700 flowchart; 700 also refers to certificate management methods that are illustrated by or consistent with the FIG. 7 flowchart, which incorporates the FIG. 6 flowchart, the FIG. 5 flowchart, and all other steps taught herein, or methods that are illustrated by or consistent with any variation of the FIG. 7 flowchart described herein 702 computationally establish a certificate chain, by installing it, enabling it, or modifying a previously established chain; an example of getting 306 a chain 704 computationally ascertain an established certificate chain; an example of getting 306 a chain 706 computationally coexist two bindings, certificates, or chains, by installing or enabling both on a given system at the same time 708 computationally specify a certificate authority in a certificate, e.g., by placing or reading a field or slot in the certificate which is dedicated to or designed for identification of a certificate authority of the certificate 710 computationally belong to a certificate chain, e.g., by placing or reading a certificate in the certificate chain; the certificate then belongs to the chain 712 computationally share an item between chains, e.g., by placing or reading the item concurrently in all of the chains 714 computationally alter a distribution 324 of a certificate, e.g., by changing a binding 132 to include a previously excluded certificate, or to exclude a previously included certificate 716 computationally interleave servings of independent certificates; examples are given herein; interleaving is different than switching from a certificate A to a certificate B, both in that interleaving requires an additional subsequent serving of certificate A followed by an additional serving of certificate B, and in that these servings occur within a relatively short time such as a day rather than over a period of months or years 718 computationally check for certificate pinning, e.g., by scanning for hard-coded certificate identifiers in files 720 computationally change a binding, e.g., by updating or replacing at least the portion of the binding that binds an identity 404 to a certificate 130 so that a different certificate in bound to the identity; also referred to as switching or updating or transitioning a binding 722 computationally vary an extent of chain independence, by enforcing more (or fewer, or merely different) independence criteria 320

724 computationally observe an error involving a certificate, e.g., via telemetry or an alert or an error code via an API 726 error involving a certificate, e.g., validation error, as represented or effectuated in a computing system, due, e.g., to certificate expiration, lack of response from a validation node, unknown issuer, or other problem 728 computationally mitigate a problem involving a certificate, e.g., by reducing or stopping use of that certificate and enabling use of a different and independent certificate in its stead 730 any step or item discussed in the present disclosure that has not been assigned some other reference numeral; 730 may thus be shown expressly as a reference numeral for various steps or items or both, and may be added as a reference numeral (in the current disclosure or any subsequent patent application which claims priority to the current disclosure) for various steps or items or both without thereby adding new matter

CONCLUSION

Some embodiments provide proxies or other servers 214 in a computing network 108 with independent 208 certificate chains 134 which facilitate mitigation 728 of certificate problems. Independence criteria 320 are enforced against two or more installed certificate chains 134 on a given server, identifying 322 and avoiding dependencies such as cross-certification 424, shared 712 certificate authorities 402, shared 712 revocation lists 434, or shared 712 certificate status protocol endpoints 432 between the certificate chains. Some embodiments serve independent certificates 130 concurrently in an active-active certificate server configuration 312. The certificate chains' coexistence and their independence from one another facilitates transitioning 720 the network from a failing issuer 314 or a failed chain to a chain that works better, thereby improving network 108 resilience and limiting damage from certificate problems. By dynamically updating 720 certificate bindings 132, some embodiments also facilitate safe deployment of new certificates 130 during migration 452 from one issuer to another. Certificate distributions 324 are computed from issuer ratios 438, network topology 450, or both.

Embodiments are understood to also themselves include or benefit from tested and appropriate security controls and privacy controls such as the General Data Protection Regulation (GDPR). Use of the tools and techniques taught herein can be used together with such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; it is not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A method of managing, in a computing network, certificates issued by certificate authorities, the method comprising automatically:
    establishing or ascertaining a first certificate chain which comprises a first binding between a first certificate issued by a first certificate authority and an identity in the computing network, such that the first certificate authority is specified in the first certificate, and the first certificate belongs to a first certificate chain;
    establishing or ascertaining a second certificate chain which comprises a second binding between a second certificate issued by a second certificate authority and the identity, such that the first binding and the second binding coexist in the computing network, the second certificate authority is specified in the second certificate, the second certificate belongs to a second certificate chain, and the first certificate chain and the second certificate chain are independent from one another in that: the certificate chains do not share any root certificate with each other, and the certificate chains do not share any intermediate certificate authority certificate with each other;
    selecting between the first certificate and the second certificate;
    serving the selected certificate;
    wherein the first certificate and the second certificate are issued by at least two certificate servers in an active-active certificate server configuration; and
    wherein during at least two time periods of no more than five minutes in duration, the time periods being separated by at least ten minutes and no more than thirty minutes, the active-active certificate server configuration serves the first certificate in multiple instances interleaved with multiple instances of serving the second certificate.

2. The method of claim 1, further comprising verifying that the first certificate chain and the second certificate chain are independent from one another, prior to serving the selected certificate, or atomically with the selecting, or both.

3. The method of claim 1, wherein selecting between the first certificate and the second certificate comprises selecting according to at least one of:
    a percentage allocated to the chain of the selected certificate;
    a topology of the computing network; or
    a random or quasi-random variable.

4. The method of claim 1, further comprising detecting that one of the issuers is an unhealthy issuer according to a health metric, and wherein the selecting does not select a certificate that is in a chain of the unhealthy issuer.

5. The method of claim 1, wherein over multiple instances of the selecting the method comprises incrementally altering a selection percentage of a particular issuer.

6. A computing system configured to manage, in a computing network, certificates issued by certificate authorities, the computing system comprising:
    at least one digital memory;
    at least two certificate servers in an active-active certificate server configuration; and
    at least one hardware processor in operable communication with the at least one digital memory, the at least one hardware processor configured to perform a certificate management method which comprises:
        (a) establishing or ascertaining a first certificate chain which comprises a first binding between a first certificate issued by a first certificate authority and an identity in the computing network, such that the first certificate authority is specified in the first certificate, and the first certificate belongs to a first certificate chain;
        (b) establishing or ascertaining a second certificate chain which comprises a second binding between a second certificate issued by a second certificate authority and the identity, such that the first binding and the second binding coexist in the computing network, the second certificate authority is specified in the second certificate, the second certificate belongs to a second certificate chain, and the first certificate chain and the second certificate chain are independent from one another in that: the certificate chains do not share any root certificate with each other, and the certificate chains do not share any intermediate certificate authority certificate with each other;
        (c) selecting between the first certificate and the second certificate;
        (d) serving the selected certificate; and
        (e) wherein, during at least two time periods of no more than five minutes in duration, the time periods being separated by at least ten minutes and no more than thirty minutes, the active-active certificate server configuration serves the first certificate in multiple instances interleaved with multiple instances of serving the second certificate.

7. The computing system of claim 6, wherein the identity comprises at least one of:
    a domain name;
    an IP address;
    a port identifier;
    a server name indication; or
    a client identity.

8. The computing system of claim 6, wherein each of the certificate chains is also independent of each of the other certificate chains in that no certificate in the certificate chain of one of the certificate authorities is signed by a certificate of any other of the certificate authorities.

9. The computing system of claim 6, wherein each of the certificate chains is also independent of each of the other certificate chains in that the certificate chains do not share any certificate revocation list with each other.

10. The computing system of claim 6, wherein each of the certificate chains is also independent of each of the other certificate chains in that the certificate chains do not share any certificate revocation list distribution point with each other.

11. The computing system of claim 6, wherein each of the certificate chains is also independent of each of the other certificate chains in that the certificate chains do not share any online certificate status protocol endpoint with each other.

12. The computing system of claim 6, wherein the identity comprises a server name indication.

13. The computing system of claim 6, wherein the active-active certificate server configuration comprises at least two gateway machines in machines configured to perform the certificate management method.

14. The computing system of claim 6, wherein the computing system is further configured to verify that the first certificate chain and the second certificate chain are independent from one another, prior to serving the selected certificate, or atomically with the selecting, or both.

15. A non-transitory computer-readable storage device configured with data and instructions which upon execution by a processor perform a method of managing, in a computing network, certificates issued by certificate authorities, the method comprising automatically:

establishing or ascertaining a first certificate chain which comprises a first binding between a first certificate issued by a first certificate authority and an identity in the computing network, such that the first certificate authority is specified in the first certificate, and the first certificate belongs to a first certificate chain;

establishing or ascertaining a second certificate chain which comprises a second binding between a second certificate issued by a second certificate authority and the identity, such that the first binding and the second binding coexist in the computing network, the second certificate authority is specified in the second certificate, the second certificate belongs to a second certificate chain, and the first certificate chain and the second certificate chain are independent from one another in that the certificate chains do not share any root certificate with each other;

selecting between the first certificate and the second certificate;

serving the selected certificate; and wherein the first certificate and the second certificate are issued by at least two certificate servers in an active-active certificate server configuration; and wherein during at least two time periods of no more than five minutes in duration, the time periods being separated by at least ten minutes and no more than thirty minutes, the active-active certificate server configuration serves the first certificate in multiple instances interleaved with multiple instances of serving the second certificate.

16. The non-transitory computer-readable storage device of claim 15, wherein the method further comprises checking for a certificate pinning.

17. The non-transitory computer-readable storage device of claim 15, wherein the method further comprises establishing or ascertaining a third certificate chain which comprises a third binding between a third certificate issued by a third certificate authority and the identity, such that each of the certificate chains is independent of each of the other certificate chains.

18. The non-transitory computer-readable storage device of claim 15, wherein the method further comprises changing a binding of a web server atomically at runtime to include the selected certificate.

19. The non-transitory computer-readable storage device of claim 15, wherein selecting between the first certificate and the second certificate comprises selecting according to at least a topology of the computing network.

* * * * *